(12) United States Patent
Dunton

(10) Patent No.: US 6,337,919 B1
(45) Date of Patent: Jan. 8, 2002

(54) FINGERPRINT DETECTING MOUSE

(75) Inventor: Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/301,172

(22) Filed: Apr. 28, 1999

(51) Int. Cl.[7] ................................................. G06K 9/00
(52) U.S. Cl. ........................................ 382/124; 345/163
(58) Field of Search ................................. 382/115, 124, 382/125; 235/380, 492; 704/246, 273; 902/3, 4, 25; 340/825.3, 825.34; 345/163, 164; 283/68; 356/71; 705/1, 26, 42

(56) References Cited

U.S. PATENT DOCUMENTS 5,838,306 A * 11/1998 O'Connor et al. .......... 345/163
5,848,231 A * 12/1998 Teitelbaum et al. ......... 713/200

* cited by examiner

*Primary Examiner*—Samir Ahmed
(74) *Attorney, Agent, or Firm*—Trop, Pruner & Hu, P.C.

(57) ABSTRACT

A mouse may include an internal fingerprint identification unit. The fingerprint identification unit may be arranged to capture the user's fingerprint when the user's finger is positioned over a mouse button which is substantially radiation transmissive. Radiation directed at the user's finger through the mouse button may be captured for image analysis and ultimately for fingerprint identification. Thus, the mouse may be used to identify users who wish to access a computer system.

11 Claims, 3 Drawing Sheets

FINGERPRINT DETECTING MOUSE

BACKGROUND

This invention relates generally to a mouse used to provide user input signals for controlling computer systems.

Often, a computer system or the network coupled to a given computer system may contain very sensitive information. Therefore, it may be desired that only authorized users obtain access.

In addition, in computer based transactions, such as banking transactions and on-line sales transactions, it may be desirable to have a secure way of determining whether a given user is who the user claims to be. While passwords have widely been used for this function, it is well known that users are not always careful with their passwords. Thus, the password protection may not always be an accurate way of ensuring user identity.

Fingerprint identification units are used in connection with computer systems. Generally, these systems are coupled to the computer system through a standalone peripheral or via a keyboard. Thus, the user must be prompted to actuate a separate input device in order to capture the user's fingerprint. Normally, the computer system has a database of fingerprints and compares the detected fingerprint to that database. Based on the comparison, the user can be assigned an access level from no access to complete access to all the files and capabilities of a given system.

Thus, there is a continuing need for better ways to assess the user's identity including ways which do not require extra user steps.

SUMMARY

In accordance with one embodiment, a mouse includes a substantially radiation transmissive mouse button. A fingerprint sensor is adapted to capture an image of a fingerprint when the user's finger is positioned over the mouse button.

DETAILED DESCRIPTION

Figure 1:
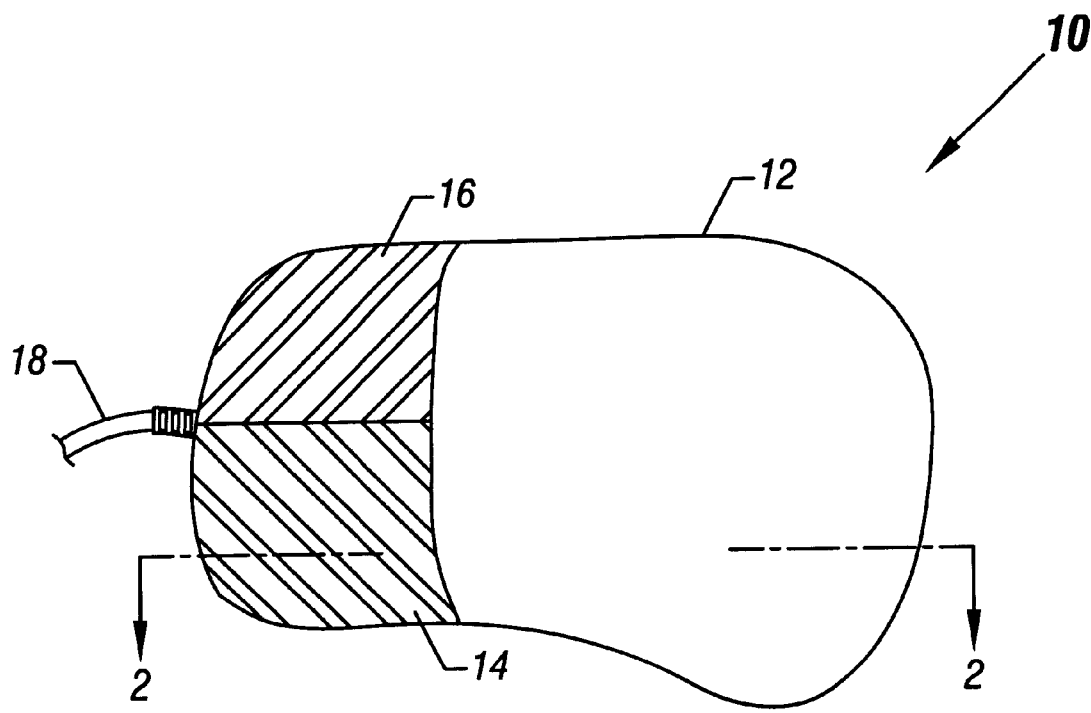
FIG. 1 is a top plan view of one embodiment of the present invention.

A mouse 10, shown in FIG. 1, includes a pair of left and right mouse buttons 14 and 16 on a housing 12. A suitable cable 18 couples the mouse to a computer system (not shown). The left mouse button 14 in one embodiment of the present invention may be formed of a substantially radiation transmissive material so that an image of the user's fingerprint may be captured when the user's finger is positioned over the mouse button 14. For left handed users, the same capability may be provided in the right mouse button 16.

Figure 2:
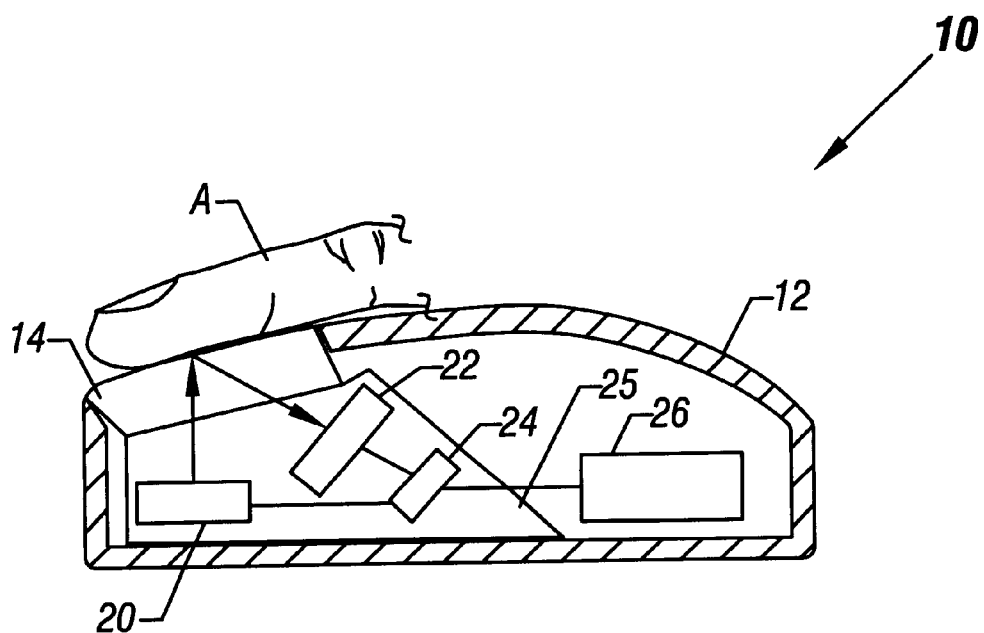
FIG. 2 is a cross-sectional view taken generally along the line 2—2 in FIG. 1 when a user's finger is positioned over a mouse button.

Referring now to FIG. 2, when the user's finger A is positioned on the left mouse button 14, an image of the user's fingerprint may be captured. In the housing 12, a radiation source 20 illuminates the lower surface of the user's finger A through the radiation transmissive button 14. In one embodiment of the present invention, the button 14 may be substantially light transmissive and the source 20 may be a source of radiation in the visible spectrum such as a light emitting diode (LED).

The light reflected off the lower surface of the user's finger is processed by optical elements 22 and captured in an image sensor 24. In one embodiment of the invention, the sensor 24 may be sensitive to light in the visible range and may be either a charge coupled device (CCD) sensor or a complementary metal oxide semiconductor (CMOS) sensor. The sensor 24 captures an image of the pattern of ridges on the user's finger. Advantageously, the light source 20 is matched to the characteristics of the sensor 24.

The sensor 24 may be coupled to conventional mouse interface circuitry 26 which is adapted to convey information about the image captured by the sensor 24 to the remainder of the computer system over the cable 18. In one embodiment of the present invention, the cable 18 may be a universal serial bus (USB) cable or a serial input/output (SIO) cable. Also, the circuitry 26 may control the timing of the operation of the radiation source 20.

The optical system 22 and the sensor 24 may be adapted to move with the mouse button 14 or may be separately mounted. For example, the optical system 22, radiation source 20, sensor 24 and button 14 may be coupled by a plate 25. If the system, including the source 20, moves with the mouse button, the system can capture the fingerprint in the right focal orientation regardless of whether the button is pushed or unpushed. If the system does not move with the mouse button, the focus may be slightly different depending on the actuation of the mouse button; however, this slight change may not adversely impact the integrity of the image. For example, the system may be designed to capture the image only when the button is in one position, either the actuated or unactuated position. In other cases, the system may be adapted to capture in either position, and is adjusted for focus to an intermediate point between the two positions so that both may be adequately imaged but neither is in perfect focus. Since in many cases, the amount of deflection of the mouse button 14 is relatively small, focus may not be a serious concern.

Figure 3:
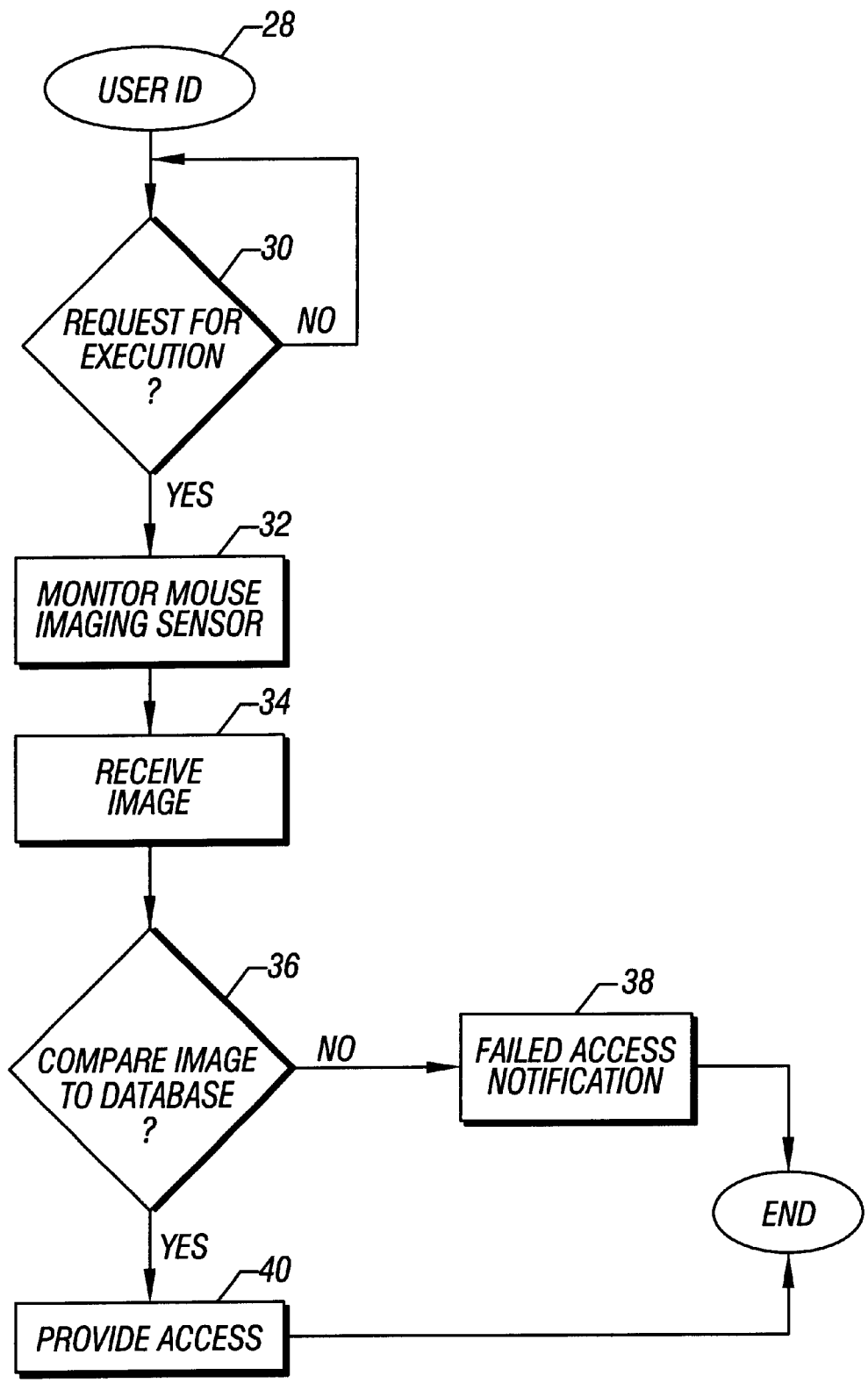
FIG. 3 is a flow chart showing software for implementing a fingerprint identification system in accordance with one embodiment of the present invention.
Figure 4:
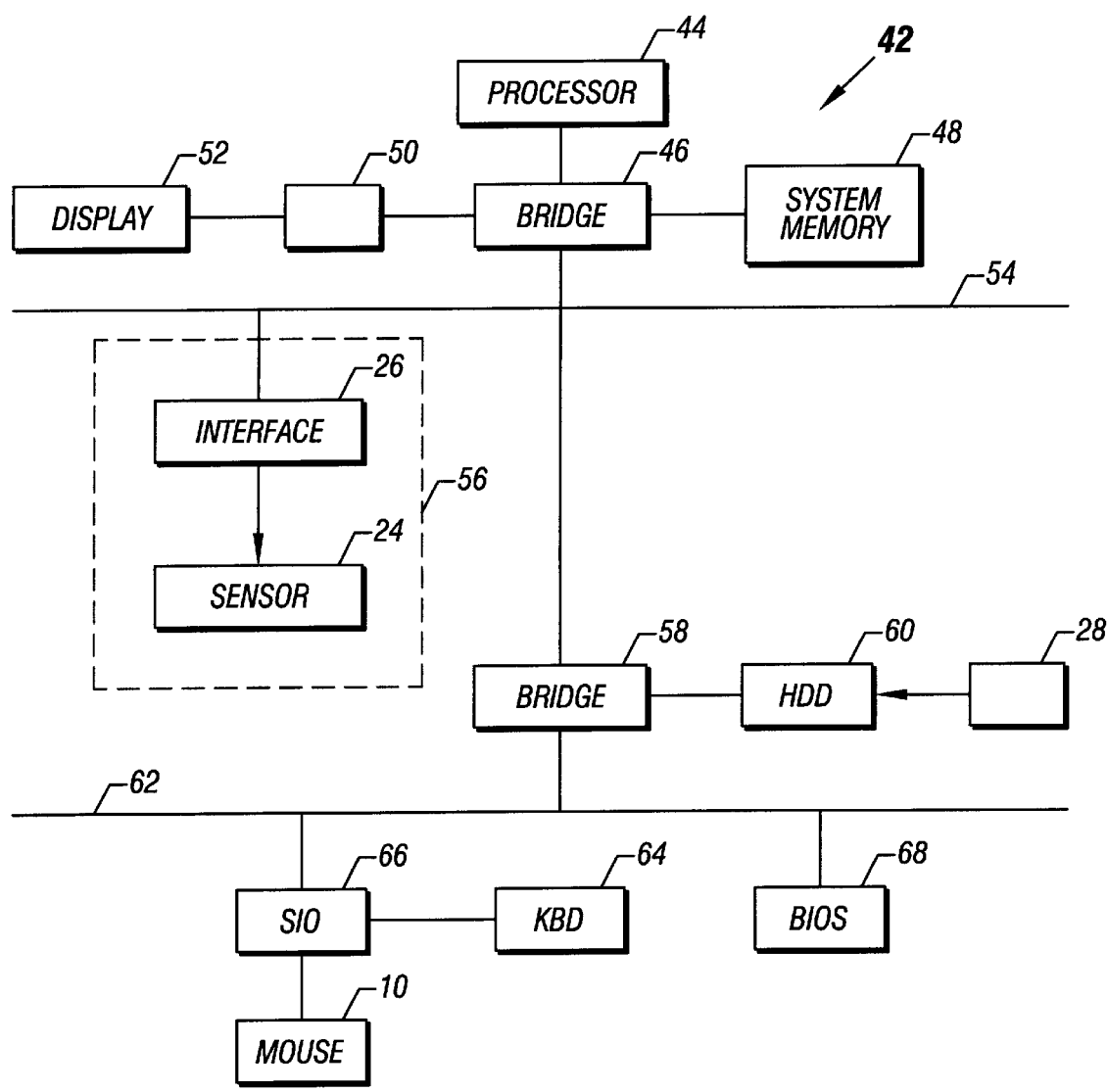
FIG. 4 is a block diagram showing one embodiment of the present invention.

Referring next to FIG. 3, the software 28 in accordance with one embodiment of the present invention, is adapted to automatically implement a user identification system. Initially, the system determines whether there is a request for execution as indicated at diamond 30. The request for execution may be a request for access to a system such as a network. It may also be a request for execution of a particular application software for which access control is desired. Thus, the request for execution detected at diamond 30 may be an initial request for access to a network, or it may arise at any time when a particular application is requested. The request for execution may be detected from the operation of the mouse button 14, upon actuation of another input device, or in any other way.

In one embodiment, the mouse button may be periodically imaged. Thus, if the computer system is left unused, a different user may not be able to use the computer system if his or her fingerprint is not recognized.

Once the request for execution has been detected, the mouse imaging sensor is monitored as indicated in block 32. Thus, the system begins imaging the area over the mouse button 14. When an image is received, as indicated in block 34, the sensor 24 may capture the image and may convey it to the electronics 26 for analysis in the computer system in one embodiment of the invention.

In the computer system, the image is compared to a database of authorized users as indicated in diamond 36. If there is a substantial match, access may be provided to the requested capabilities, as indicated in block 40. Otherwise, the user is notified that access has been denied, as indicated in block 38.

While the above software illustrates a system in which the image analysis is done in a host computer system, in some embodiments it is also possible to do the image analysis using processing capabilities provided within the mouse 10 itself. In such case, the amount of information which the mouse must send back over the cable 18 to the computer system is reduced.

According to one embodiment of the present invention, the hardware for implementing a computer system 42 which acts as a host for the mouse 10, includes a processor 44 coupled to a bridge 46 which may be north bridge in one embodiment of the present invention. The bridge 46 is coupled to system memory 48 and a graphics accelerator 50. A display 52 may be coupled to the graphics accelerator 50.

The bridge 46 also couples a bus 54 which is in turn coupled to the imaging sensor 24 through an appropriate interface circuitry 26. The sensor may be integrated with the interface circuitry to form a single device 56. The interface circuitry 26 may itself include a processor for conducting analyses on the image information detected by the sensor 24. Alternatively, the interface may simply interface the sensor with the processor 44.

In one embodiment, a second bridge 58 couples a hard disk drive 60 which may contain the software 28 for implementing specific embodiments of the imaging device as a fingerprint identification system. The disk drive may also store the database of user fingerprint images.

The bridge 58 is coupled to another bus 62 which couples the keyboard 64 and the mouse 10 through a serial input/output (SIO) interface 66, for example. A binary input/output system (BIOS) 68 may also be coupled to the bus 62.

Thus, the conventional mouse functions may be coupled to the bus 62 while other systems such as the imaging system may be coupled to the bus 54, in one embodiment of the invention. In one embodiment of the present invention, separate wires may be provided within the cable 18 for each of these functions. Alternatively, the mouse functions and the imaging functions may be coupled through the SIO 66 in one embodiment of the present invention. In other embodiments, a USB interface may be utilized for both the image and the mouse signals.

In some embodiments, it may be desirable to prevent replacement of the fingerprint detecting mouse with another mouse which may aid in circumventing the protection provided by the fingerprint identifying mouse. For example, in some embodiments, the mouse may include a memory such as a FLASH memory which stores a mouse identification number which is a unique identification number for each such mouse. In an initial set-up program in the host computer, the mouse identification number may be recorded. If a different mouse is plugged into the host computer with a different number or no number at all, a computer may refuse to accept the new mouse capability. The software check of the mouse may be done continuously or may be done during an initial log-on sequence or at boot-up.

Thus, in some embodiments the user may be identified without requiring extra user steps. In some embodiments, the user may not even be aware that a fingerprint analysis is being conducted.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A mouse comprising:
   a substantially radiation transmissive mouse button;
   a fingerprint sensor to capture an image of a fingerprint when the user's finger is positioned over the mouse button; said fingerprint sensor comprising
   a light source to direct light through said mouse button, an optical, system for receiving light reflected from the user's finger over the mouse button and a sensor, wherein said light source, optical system and sensor are mounted to move with said mouse button.

2. The mouse of claim 1 wherein said mouse button is substantially light transmissive and said sensor is adapted to capture an image of the user's fingerprint.

3. The mouse of claim 1 including a source of radiation which is directed at the mouse button.

4. The mouse of claim 3 wherein said sensor is arranged to detect light from said radiation source when the user's finger is positioned over the mouse button.

5. A method comprising:
   providing a mouse having a substantially radiation transmissive mouse button;
   capturing information about the user's fingerprint when the user's finger is situated over said mouse button by directing a light beam through said mouse button, so that said light may be reflected by the user's finger and detected within said mouse, and providing a sensor that produces an image of the user's fingerprint and transmits that image from the mouse to a host computer; and
   mounting said sensor to move with said mouse button.

6. The method of claim 5 including controlling access to a computer system based on said fingerprint information.

7. A computer system comprising:
   a processor;
   a memory coupled to said processor; and
   a mouse coupled to said processor, said mouse to capture information about an image of the user's fingerprint when the user's finger is positioned over the mouse, said mouse including a substantially radiation transmissive mouse button, a source of illumination which is directed at the mouse button, and an image sensor arranged to detect light from said source when the user's finger is positioned over the mouse button, wherein said sensor is mounted to move with said mouse button.

8. The system of claim 7 wherein said processor is adapted to compare information about said fingerprint to a database containing fingerprint information.

9. The system of claim 7 wherein said processor is adapted to analyze said fingerprint image information.

10. The system of claim 7 further including a light source adapted to direct light through said mouse button, an optical system for receiving light reflected from the user's finger over the mouse button and a sensor, all of said elements adapted to move with said mouse button.

11. The system of claim 7 wherein said mouse is adapted to control access to said computer system.

\* \* \* \* \*